United States Patent [19]
Tolopka

[11] Patent Number: 6,064,976
[45] Date of Patent: May 16, 2000

[54] SCHEDULING SYSTEM

[75] Inventor: Stephen J. Tolopka, Portland, Oreg.

[73] Assignee: Intel Corporation, Santa Clara, Calif.

[21] Appl. No.: 09/098,577

[22] Filed: Jun. 17, 1998

[51] Int. Cl.[7] .................................................... B06F 17/60
[52] U.S. Cl. ................................ 705/9; 705/8; 395/145; 348/155
[58] Field of Search ........................... 364/401; 379/265; 705/8, 9; 709/204, 205, 224; 345/326, 273; 382/218

[56] References Cited

U.S. PATENT DOCUMENTS

| | | | |
|---|---|---|---|
| 4,162,610 | 7/1979 | Levine | 58/148 |
| 4,626,836 | 12/1986 | Curtis et al. | 340/700 |
| 4,817,018 | 3/1989 | Cree et al. | 364/518 |
| 4,922,468 | 5/1990 | Menezes | 367/139 |
| 5,050,077 | 9/1991 | Vicent | 364/401 |
| 5,124,912 | 6/1992 | Hotaling et al. | 707/10 |
| 5,164,992 | 11/1992 | Turk et al. | 382/2 |
| 5,270,920 | 12/1993 | Pearse et al. | 364/401 |
| 5,303,145 | 4/1994 | Griffin et al. | 364/401 |
| 5,317,683 | 5/1994 | Hager et al. | 395/145 |
| 5,317,699 | 5/1994 | Sugita et al. | 711/147 |
| 5,323,314 | 6/1994 | Baber et al. | 705/8 |
| 5,375,068 | 12/1994 | Palmer et al. | 364/514 |
| 5,390,132 | 2/1995 | Shieoe et al. | 364/514 |
| 5,412,738 | 5/1995 | Brunelli et al. | 382/115 |
| 5,434,913 | 7/1995 | Tung et al. | 379/202 |
| 5,459,859 | 10/1995 | Senda | 707/10 |
| 5,499,291 | 3/1996 | Kepley | 379/265 |
| 5,651,445 | 7/1997 | Steven et al. | 198/447 |
| 5,675,511 | 10/1997 | Prasad et al. | 364/514 |
| 5,731,832 | 3/1998 | Ng | 348/155 |
| 5,790,798 | 8/1998 | Beckett, II et al. | 395/200.54 |
| 5,872,865 | 2/1999 | Normile et al. | 382/224 |
| 5,901,246 | 5/1999 | Hoffberg et al. | 382/209 |
| 5,903,637 | 5/1999 | Hogan et al. | 379/203 |

FOREIGN PATENT DOCUMENTS

| | | | |
|---|---|---|---|
| 19722479 | 5/1997 | Germany | G06F 17/60 |
| WO 98/21911 | 5/1998 | WIPO | G06F 17/60 |

OTHER PUBLICATIONS

Michael Miley, "Getting The Team Together: Lan Group Scheduler Grow Up", Corporate Computing, V1 n6 p197(3) Dec. 1992.

Guy M. Steven, "Remote Sensing: Opportunity Waiting To Happen", Satellite Communications, v15, n5, p14(3) May 1991.

"Vitual Reality Software Allows Users To Create New Worlds", Newsbytes News Network Feb. 18, 1992.

Ken Phillips, "Air ID Eliminates Passwords,; RF Ideas' Device Uses Radio Waves to Detect Users' Presence", (RF IDeas' PC Security Device), (Hardware Review)(Evaluation) PC Week, v15, n12, p98(1) Mar. 23, 1998.

Cary Lu, "The PowerPC's fast future" (outlook for CPUs in next 10 years) (Industry Trend or Event), MacWorld, v13, n1s p37(1) Jan. 1996.

"Electrical and electronic Devices" (L–R 100 Competition Winners), Research & Development, v28, p72(3) Oct. 1986.

*Primary Examiner*—Emanuel Todd Voeltz
*Attorney, Agent, or Firm*—Trop, Pruner, Hu & Miles, P.C

[57] ABSTRACT

A scheduling system includes a detection circuitry and a scheduling processor. The detection circuitry is coupled to a peripheral input device and receives data from the peripheral input device. The received data is analyzed to detect an individual's presence and to generate information indicating whether an individual was detected. The scheduling processor includes a user input interface receiving schedule criteria and a data interface to receive information from the detection circuitry. The scheduling processor can analyze received schedule criteria and data from the detection circuitry to determine whether the schedule criteria are satisfied. Furthermore, the system includes an interface coupling the detection circuitry to the scheduling processor data interface.

20 Claims, 4 Drawing Sheets

SCHEDULING SYSTEM

BACKGROUND INFORMATION

This invention relates to scheduling of meetings and other interactions between participants.

Scheduling meetings and other events among multiple participants can be a difficult task. This is particularly true where events must be scheduled on short notice or where the scheduler has no control over the participants' schedules. Scheduling problems can, however, be lessened using computer assisted scheduling tools. For example, using a computerized calendar application, schedules of prospective event participants can be stored in a host computer database. A person desiring a meeting or other interaction can then select a required list of participants from among the prospective attendees and, using computerized scheduling tools, determine available meeting times by analyzing the various participants' schedules.

Although calendar based schedulers can ease scheduling problems, they may be ineffective if the prospective participants do not keep their individual calendars up to date. In such a case, a scheduling system may make incorrect assumptions about participant availability. A technique for determining potential event schedule times that does not requiring detailed record keeping by prospective participants is therefore desirable.

SUMMARY

In general, in one aspect, the invention features a scheduling system including detection circuitry and a scheduling processor. The detection circuitry is coupled to an input device to detect an individual's presence. The scheduling processor receives schedule requests and detection data from the detection circuitry and determines whether the detector data satisfies a schedule request.

DETAILED DESCRIPTION

Figure 1:
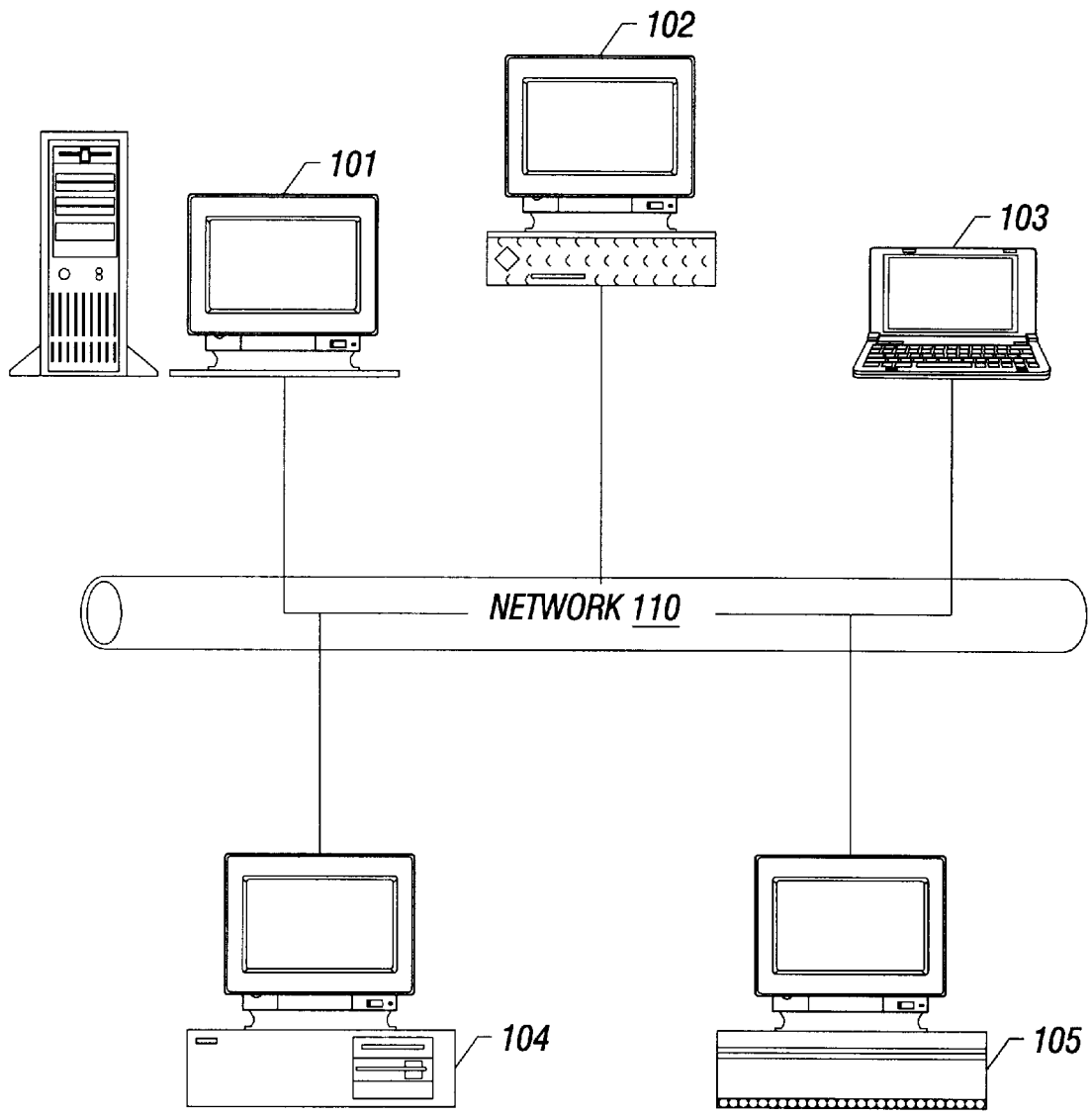
FIG. 1 depicts an exemplary computer network, according to the invention.

Referring to FIG. 1, a scheduling system 100 can be implemented on one or more computers 101–105 connected by a local or wide area network 110. The system 100 may include both distributed and centralized computers and may include terminals coupled to a centralized computer. The computers 101–105 can exchange scheduling related information over the network 110. The network 110 may be a local area network wherein computers 101–105 communicate using the Ethernet and the IPX protocol, a wide area network such as the Internet wherein computers 101–105 communicate using the TCP/IP protocol, a dial-up network including computers connected by modems, a hybrid network including multiple interconnected networks, or other form of computer interconnection.

In the network 100, each computer 101–105 includes scheduling request software and participant registration software. The scheduling request software includes programs to receive event request parameters from a requesting user. The request parameters detail characteristics of a desired event that a user wishes to schedule. Such parameters can include a list of required and optional participants, a desired time period, the expected duration of the event, and the type of event being scheduled. The type of scheduled event can be, for example, a video conference, a multi-party telephone call, or a text-message based communication between computers. The scheduling request software exchanges data with participant registration software to determine when particular participants are available and when the requested event can occur.

Figure 2:
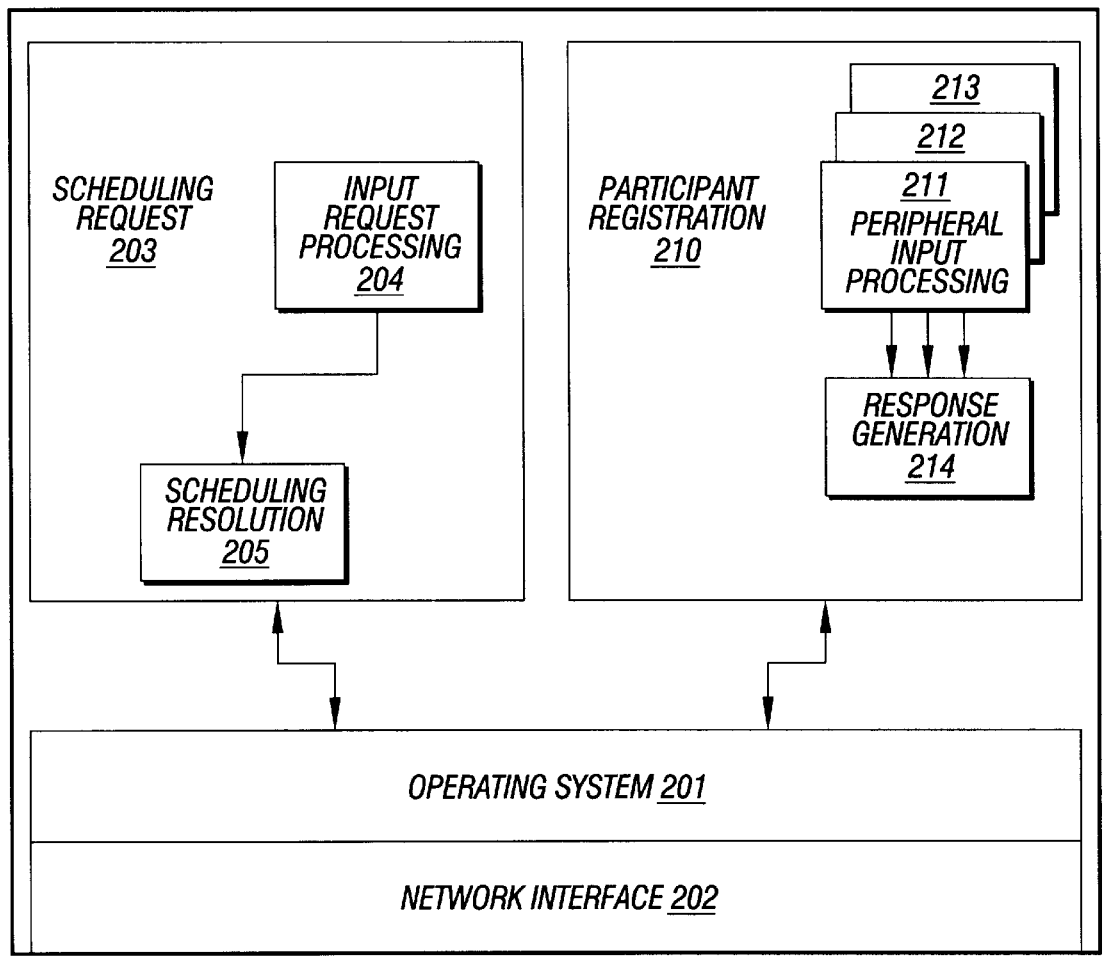
FIG. 2 depicts exemplary software components, according to the invention.

The operation of the scheduling request software and participant registration software will now be described with reference to FIGS. 1 and 2. FIG. 2 depicts various software components present in computers 101–105. These components include scheduling request software 203 and participant registration software 210 functions. The scheduling request software 203 and participant registration software 210 may be implemented as one or more tasks within a computer system. In some implementations, a particular computer may include only request software 203 functions or only registration software 210 functions or these functions may be distributed among two or more computers. The request 203 and registration 210 software interact with operating system 201 and network interface 202 to exchange information within and among computers 101–105. Thus, scheduling information from, for example, the scheduling request software 203 at computer 101 may be exchanged with the participant registration software 210 at computer 102. As will become clear from the description that follows, the scheduling software 200 is advantageous for scheduling events on short notice. For example, the system 200 can be used to determine whether a group of individuals are all present in their offices at a given time. This can be used to infer that all the individuals are available to participate in a group telephone conference call. Other types of events may also be scheduled using the system 200.

To schedule an event, the scheduling request software 203 provides a user input interface allowing event parameters such as the time, duration, participants, and the form of the event to be received. The event parameters may be received using a keyboard, mouse, computer database, a remote terminal, or other input device. For example, in a graphical user interface (GUI) implementation, the user input interface may include a series of input dialogs, check boxes, menu list, and fill-in boxes and data may be provided using a keyboard and mouse. In an alternate implementation, the user interface can be a software application programming interface (API) allowing the request software 203 to receive the event parameters from a secondary software application. A parameter input routine 204 stores the received event request parameters as a data structure describing the requested event and provides a data to the schedule resolution software 205. The schedule resolution software 205 may then attempt to schedule the requested event.

To schedule an event, the resolution software 205 must first determine the availability of each required participant. To do so, the resolution software 205 can send one or more participant request queries to participant registration software 210 at various network computers 101–105. Using stored and dynamically determined information, the participant registration software 210 responds to the request query by indicating whether the requested participant is available.

Prior to sending queries to registration software 210, the resolution software 205 must determine which of the various computers on the network 100 are to receive such queries.

In various implementations this may be determined using a static lookup table, a directory mechanism, or a broadcast mechanism. In a static table lookup implementation, each potential participant is associated with one computer on the network 100. The association between potential participants can be stored in a predetermined mapping table accessible by the resolution software 205. For each individual to be included in a scheduled event, the resolution software 205 can look in the mapping table to determine the appropriate computer 101–105 to query. Alternatively, in a directory lookup implementation, information about the location of each potential participant may be stored in a dynamically updated directory. For example, on a network 100 wherein each participant can access the network 100 through any one of computers 101–105, information may be stored at a server (not shown) indicating which computer 101–105 the particular user is accessing or has most recently accessed. This may be done using, for example, Novell Directory Services (NDS)(r), Microsoft(r) Active Directory Service, a Lightweight Directory Access Protocol (LDAP) directory, or other directory service. The resolution software 205 may then select a computer to query based on the data in the dynamically updated directory. In still another implementation, a broadcast mechanism can be used. In this case, the resolution software 205 will send queries to each computer 101–105 on the network 100 to request information regarding each desired participant. Other mechanisms and combinations including the above described mechanisms may also be used.

Once a query has been received by participant registration software 210 at a computer 101–105, the registration software 210 will determine whether the desired participant is available. Registration software 210 uses inferential information and inferential reasoning to determine the availability of a desired participant. Inferential information and reasoning allows the registration software 210 to inferentially determine whether a requested participant is available. Such an inferential determination is made without directly querying the individual about his or her availability and without requiring the individual to directly divulge his or her schedule. Inferential information is transparently derived from the various data streams processed by a computer. Once a requested participant's availability is determined, the registration software 210 can communicate such information back to the request software 203. The request software 203 or request software user can then determine whether the desired participant is to be contacted such as by a phone call, a video conference, or through a person-to-person meeting.

Figure 3:
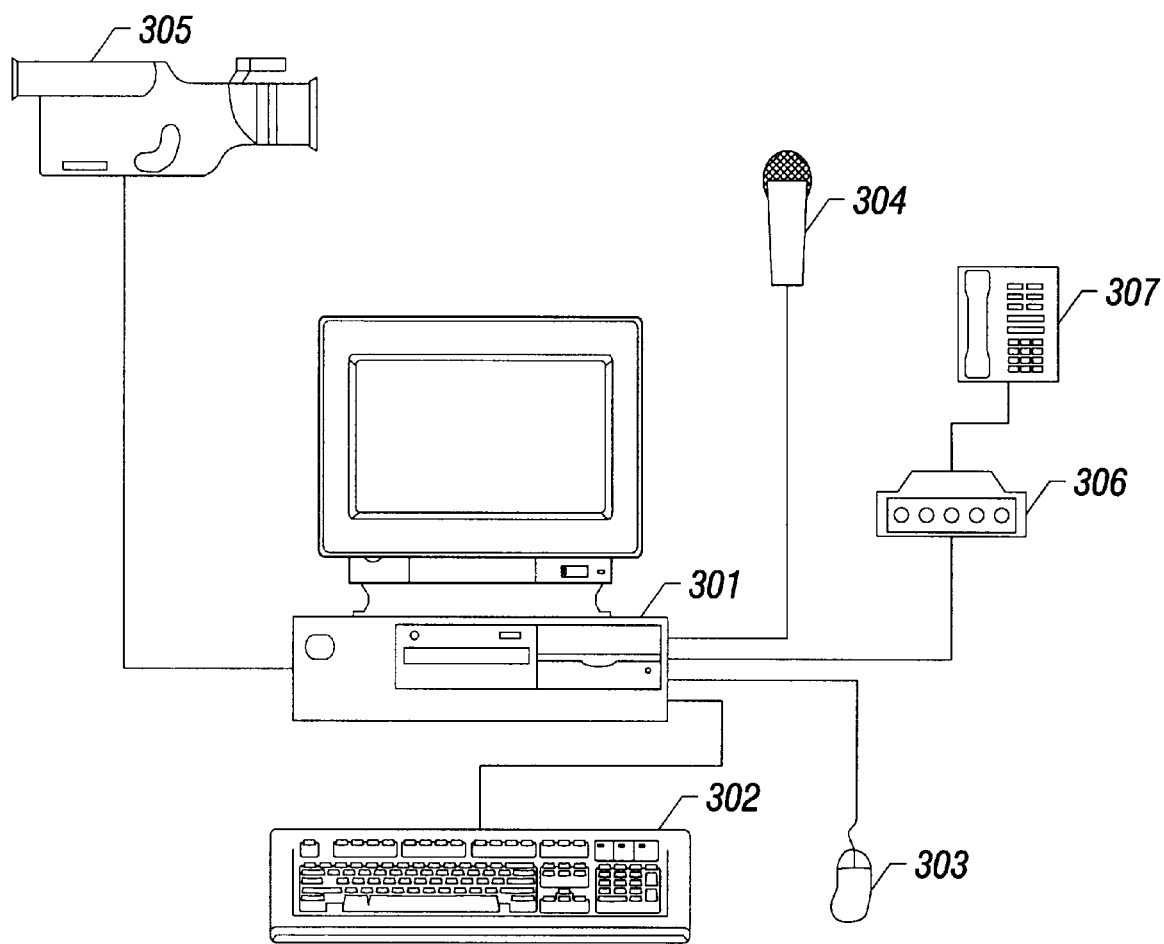
FIG. 3 depicts a computer with exemplary peripherals, according to the invention.

The secondary information used by registration software 210 to determine the availability of a potential participant can originate at the input devices of the computer processing the participant request query. Each computer on the network 100 can have a number of input devices as shown in the exemplary computer system 300 of FIG. 3. For example, a computer 301 may input data from a keyboard 302, a mouse 303, a microphone 304, a digital video camera 305, a modem 306 and a telephone line 307 as well as various other input devices (not shown).

The registration software 210 includes software routines 211–213 that can receive and process input data from computer peripherals 302–307. For example, software routines 211 may process data from the keyboard 302 and mouse 303, software routines 212 may process data from the microphone 304, and software routines 213 may process data from a digital video input connection 305. Using the software routines 211–213, the computer 201 analyzes input data from various peripheral devices 302–305. In various implementations, additional software routines can be added to the system 210 to process additional peripheral inputs.

The usage patterns and inputs from devices 302–305 are used to create an inference as to whether a particular participant is available for an event being scheduled. For example, using routines 211–213, the computer 301 can analyze keyboard 302 and mouse 303 activity to determine the last period of usage. If either the keyboard 302 or mouse 303 were used within a designated time period, the computer 301 may infer that the desired participant is present at the computer or in his or her office and therefore available to receive a phone conference call.

In addition to keyboard 202 and mouse 203 inputs, the computer 301 may infer the presence of a participant using visual information from a camera 305 and audio information from a microphone 304. To infer presence using the microphone 304, the input processing routines 212 process the received sound input to determine whether the received inputs meet certain criteria. For example, the sound level may be analyzed to determine if it is above a designated threshold or the sound input can be analyzed to detect human voice patterns.

Video processing by routines 213 may also be used to determine an individual's availability. For example, the routines 213 may implement motion detection and pattern recognition algorithms to determine an individuals presence. Motion detection algorithms may be provided through the use of a commercially available product such as Digital Radar(tm) from the Connectix Corporation. Pattern recognition can be used, for example, to analyze an image captured using a video input device to detect physical features of a desired participant. For example, video input may be analyzed using video processing products such as TrueFace from Miros, Inc., or FaceIt from Visionics Corp. to detect facial features of individuals within a camera's field of view and to thereby detect the presence of a desired participant. The particular facial features being searched for may be supplied by the scheduling request software 203, or stored in a database accessible by the routines 213.

Additional peripheral input routines may be included as part of the registration software 210 to process inputs from additional devices. For example, inputs from infrared or ultrasonic motion detectors and pressure sensors may be used.

After processing the various peripheral 302–307 inputs, the routines 211–213 each generate an estimate of the requested participant's availability. An availability estimate may be chosen from a range of values allowing the routines 211–213 to report a confidence in their produced result. For example, each routine 211–213 may determine availability estimate value in the range of −10 to +10. A value of −10 may express a strong confidence in a conclusion that the individual is not available, while a value of +10 expresses a strong confidence that the individual is available. The various participant availability estimates from routines 211–213 are then processed by response generation software 214. The response generation software 214 determines response value to be sent to the scheduling request software 203.

The response value sent from response generation software 214 to request software 203 may be determined by weighting individual availability estimates from routines 211–213. This weighing of estimates from 211–213 may take into account the accuracy as well as the confidence of the results provided by routines 211–213. If, for example, the participant availability estimates determined by processing routine 211 are less accurate than those determined by routine 213, the output from routine 211 may be given less weight in the final response generated by the response generation software 214.

The weighing of responses from routines 211–213 can be done using, for example, a predetermined weighing table. Each row of the weighing table may indicate a particular routine 211–213 or input source 302–307 and a weighing factor associated with that source. For example, if keyboard and mouse input determinations by routine 211 are relatively inaccurate compared to video input determinations by routine 213, a weighing factor of 50% may be associated with routine 211 while a factor of 150% may be associated with routine 213. If, for example, routine 211 produced a estimate (on a −10 to +10 scale) of +6 and routine 213 produced an estimate of −3, a weighed combination of these values generated by the response generation routine 214 would be computed as −1.5. This value would subsequently be sent as a response to the request software 203. Other value scaling and weighing mechanisms may also be used. Alternatively, the values from each of the routines 211–213 may remain distinct and be individually reported to the scheduling request 203.

As each of the queried computers on the network 100 complete peripheral input processing and response generation, they may respond to the scheduling request software 203 at the computer initiating the query. These responses are received by the scheduling resolution software 205 which then determines when and if an event can be scheduled. The resolution software 205 can then report its conclusions to a user or can initiate the event by, for example, sending a message over the network 100 to a notification application residing at each computer. In a Microsoft Windows 95(r) environment, the notification application can be the Microsoft WinPopup(tm) utility that is included with the Windows 95 operating system. In other implementations, notification can be provided by electronic mail (e-mail) or, by using a telephone interface such as Windows 95 TAPI (Telephony Application Programming Interface). Notifications can also be provided by ringing the participant's phone and playing a pre-recorded message, by sending a message to a pager, by establishing a connection to the desired participant, by initiating a multi-party call to all of the participants, or by using International Telecommunication Union Recommendation H.320 (ITU-T H.320) protocols to initiate a video conference with all participants.

Figure 4:
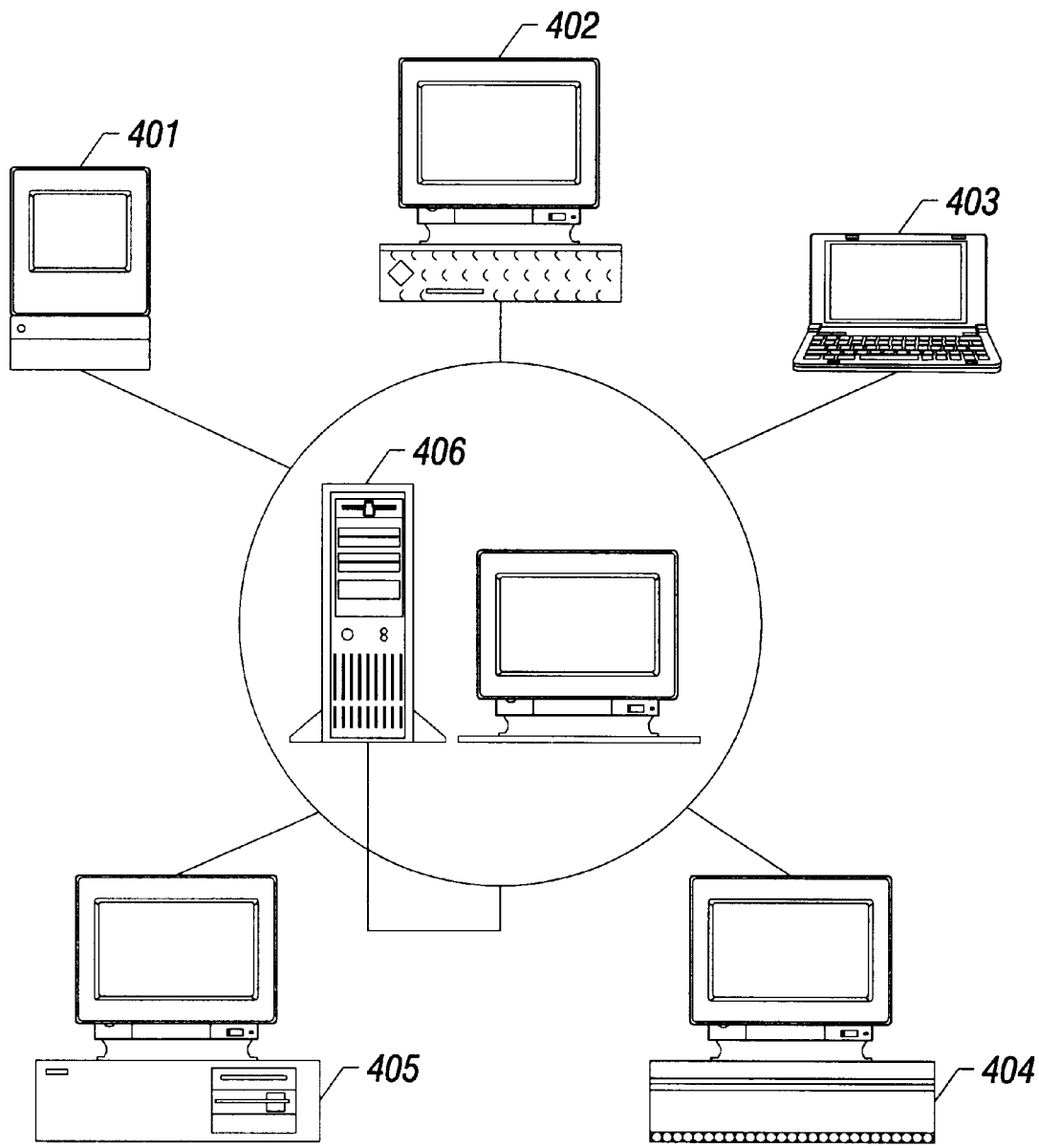
FIG. 4 depicts an exemplary computer network, according to the invention.

Meeting scheduling may be processed on a distributed or on a centralized basis. Referring to FIG. 4, in a centralized system, meeting requests from one or more computers 401–405 are sent to a centralized scheduling processor 406. The scheduling processor 406 may include scheduling resolution software 205 (FIG. 2) while each computer 401–405 includes input request processing software 204 and participant registration 210 software. In the network 400, scheduling requests are input at one of computers 401–405, the input request is processed by input processing software 204 and sent to the scheduling resolution software 205 at the server 406. The server 406 then determines appropriate computers 401–405 to query, sends queries to those computers, and receives responses from them. When its queries have been responded to, the server 406 will determine an appropriate schedule result and respond to the original requesting computer.

In an autonomous implementation, each computer 101–105 (FIG. 1) or 401–406 (FIG. 4) may autonomously process and report results from processing of input data by peripheral processing software 211–213 (FIG. 2). For example, each computer may continually monitor input devices 302–307 and when a particular individual is detected may send information to a centralized server 406 regarding the detected individual. The information reported to the server 406 may be stored for later use to process event schedule requests. Alternately, in a centrally controlled implementation, each computer 101–105 (FIG. 1) or 401–406 (FIG. 4) may wait for a request from another computer or application process prior to processing input data from peripherals.

Implementations of the invention may include one or more of the following advantages. The invention can aid in establishing impromptu meeting times and scheduling meetings on short notice. The invention may automate scheduling without requiring detailed individual schedules to be maintained. Implementations may allow active or passive scheduling.

While the present invention was described with respect to a limited number of preferred embodiments, those skilled in the art will appreciate numerous modifications and variation. Therefore, it is intended that the appended claims cover all such modifications and variations as will obtain as true spirit and scope of the present invention.

What is claimed is:

1. A scheduling system comprising:

detection circuitry operatively connectable to an input device to detect an individual's presence; and a scheduling processor to receive schedule requests, to receive detection data from said detection circuitry and to determine whether the detection data satisfies a schedule request.

2. The system of claim 1 including:

a connection interface coupling the detection circuitry and the scheduling processor, said interface including a first computer network interface device operatively coupling the detection circuitry to a computer network; and a data interface including a second computer network interface device to operatively couple the scheduling processor to a computer network.

3. The system of claim 2 further comprising:

second detection circuitry connectable to a second input device to detect an individual's presence; and wherein the connection interface operationally couples the second detection circuitry to the scheduling processor to send detection data to the scheduling processor, and wherein the scheduling processor is further configured to determine whether the second detection data satisfies schedule request.

4. The system of claim 2 wherein the schedule request comprises a schedule time period, the detection data comprises a detection time period, and detection data satisfies the schedule request when the detection time period and schedule time period match.

5. The system of claim 1 wherein said input device comprises a video input device, and the detection circuitry is configured to analyze the data from the input device to detect an individual's presence.

6. The system of claim 5 wherein the detection circuitry comprises a software configurable processor.

7. Computer-implemented scheduling method comprising:

receiving schedule criteria including a first time period;

receiving first input data;

generating participant time information including a second time period wherein the first input data indicates an individual is present; and producing report information including a time period match between the first time period and the second time period.

8. The method of claim 7 including receiving information identifying a desired event participant, and generating information associated with an identified individual.

9. The method of claim 8 wherein:
generating information associated with the identified individual comprises processing an audio input signal using sound input analysis to determine whether a human voice pattern is present in the audio input signal.

10. The method of claim 7 including:
receiving second input data and generating participant time information including receiving second input data and generating participant time information at a second computer.

11. The method of claim 10 further comprising:
sending a request from the first computer to the second computer, the request identifying a desired event participant; and
wherein generating participant time information includes generating time information associated with the desired event participant.

12. An article comprising a computer-readable medium storing instructions for causing a computer to:
receive schedule criteria including a first time period;
receive first input data;
generate participant time information including a second time period when the individual is present; and
produce report information including a time period match between the first time period and the second time period.

13. A computer-implemented scheduling method comprising:
inferentially detecting a person's presence at a remote station without contacting the person; and
scheduling a conference when the person is inferentially detected at a remote station.

14. The method of claim 13 wherein inferentially detecting includes analyzing keyboard activity.

15. The method of claim 13 wherein inferentially detecting includes analyzing mouse activity.

16. The method of claim 13 wherein inferentially detecting includes analyzing video information from a camera at the remote station.

17. The method of claim 13 wherein inferentially detecting includes analyzing audio information from a microphone at the remote station.

18. The method of claim 13 wherein inferentially detecting includes analyzing information from a motion detector at the remote station.

19. A computer-implemented scheduling method comprising:
receiving schedule criteria including a first time period;
receiving first input data;
generating participant time information including a second time period wherein the first input data indicates an individual is present, comprising:
analyzing the first input data to produce a first detection value;
analyzing the second input data to produce a second detection value;
modifying the first detection value by a factor;
modifying the second detection value by a second factor;
producing participant time information based on the modified first detection value and the modified second detection value; and
producing report information including a time period match between the first time period and the second time period.

20. A computer-implemented scheduling method, comprising:
receiving schedule criteria including a first time period;
receiving first input data, wherein said input data comprises a video input signal;
receiving information identifying a desired event participant;
generating information associated with an identified individual, comprising processing the video input signal using video pattern recognition to determine whether an image of the identified individual appears in the video input signal;
generating participant time information including a second time period wherein the first input data indicates an individual is present; and
producing report information including a time period match between the first time period and the second time period.

* * * * *

UNITED STATES PATENT AND TRADEMARK OFFICE
CERTIFICATE OF CORRECTION

PATENT NO. : 6,064,976
DATED : May 16, 2000
INVENTOR(S) : Stephen J. Tolopka

It is certified that error appears in the above-identified patent and that said Letters Patent are hereby corrected as shown below:

In col. 8, lines 9, 10 and 17, please replace ":" with --;--.

Signed and Sealed this

Fifteenth Day of May, 2001

Attest:

NICHOLAS P. GODICI

Attesting Officer     Acting Director of the United States Patent and Trademark Office